US011997635B2

United States Patent
Duo et al.

(10) Patent No.: US 11,997,635 B2
(45) Date of Patent: May 28, 2024

(54) ESTABLISHING SIMULTANEOUS MESH NODE CONNECTIONS

(71) Applicant: SonicWALL Inc., Milpitas, CA (US)

(72) Inventors: Zhuangzhi Duo, Fremont, CA (US); Atul Dhablania, San Jose, CA (US)

(73) Assignee: SonicWALL Inc., Milpitas, CA (US)

( * ) Notice: Subject to any disclaimer, the term of this patent is extended or adjusted under 35 U.S.C. 154(b) by 0 days.

(21) Appl. No.: 16/883,275

(22) Filed: May 26, 2020

(65) Prior Publication Data

US 2020/0359349 A1 Nov. 12, 2020

Related U.S. Application Data

(63) Continuation-in-part of application No. 16/404,655, filed on May 6, 2019, which is a continuation-in-part (Continued)

(51) Int. Cl.
*H04W 60/04* (2009.01)
*G06K 7/10* (2006.01)
(Continued)

(52) U.S. Cl.
CPC ........ *H04W 60/04* (2013.01); *G06K 7/10722* (2013.01); *G06K 7/1417* (2013.01);
(Continued)

(58) Field of Classification Search
CPC ....... H04W 60/04; H04W 4/80; H04W 12/03; H04W 84/18; H04W 12/001;
(Continued)

(56) References Cited

U.S. PATENT DOCUMENTS 7,215,926 B2    5/2007  Corbett et al.
7,576,646 B2    8/2009  Hayden et al.
(Continued)

FOREIGN PATENT DOCUMENTS

CN    101807998 A   *  8/2010   ........... H04L 63/065
CN    101431519 B   *  6/2011   ........... H04L 9/0841
(Continued)

OTHER PUBLICATIONS

Guide to Wireless Mesh Networks By Sudip Misra, Subhas Chandra Misra and Isaac Woungang pp. 537; Published (Year: 2009).*
(Continued)

*Primary Examiner* — Bassam A Noaman
*Assistant Examiner* — Ali H. Cheema
(74) *Attorney, Agent, or Firm* — Polsinelli LLP

(57) ABSTRACT

Methods and apparatus that registers a plurality of mesh node devices to operate as part of a wireless mesh network after a user device scans encoded information that is unique to each mesh node of a plurality of different mesh nodes. After codes associated with different respective mesh nodes are scanned by a user device, that user device may communicate with these different mesh nodes via a low power communication interface and the user device may send registration information to a registration computer via a secure communication channel. Apparatus may also receive a validation code from the registration computer via a communication channel that is different from the secure communication channel and these apparatus may then send the validation code to the registration computer via the secure communication channel when the user device is validated by the registration computer.

16 Claims, 6 Drawing Sheets

Related U.S. Application Data of application No. 16/397,935, filed on Apr. 29, 2019, now Pat. No. 10,972,916.

(60) Provisional application No. 62/942,809, filed on Dec. 3, 2019.

(51) Int. Cl.

| | | |
|---|---|---|
| *G06K 7/14* | (2006.01) | |
| *H04W 4/80* | (2018.01) | |
| *H04W 12/03* | (2021.01) | |
| *H04L 9/40* | (2022.01) | |
| *H04W 12/55* | (2021.01) | |
| *H04W 84/18* | (2009.01) | |

(52) U.S. Cl.
CPC ............. *H04W 4/80* (2018.02); *H04W 12/03* (2021.01); *H04L 63/0272* (2013.01); *H04W 12/55* (2021.01); *H04W 84/18* (2013.01)

(58) Field of Classification Search
CPC . H04W 12/003; H04W 12/009; H04W 12/06; H04W 12/08; G06K 7/10722; G06K 7/1417; G06K 7/1413; G16H 10/40; G06F 21/44; H04L 12/2809; H04L 63/0807; H04L 63/0892; H04L 9/3228; H04L 9/3213
USPC ........................ 726/2; 380/270; 370/254, 312
See application file for complete search history.

(56) References Cited

U.S. PATENT DOCUMENTS

| | | | |
|---|---|---|---|
| 8,189,608 B2 | 5/2012 | Duo et al. | |
| 9,071,416 B2* | 6/2015 | Liu | H04W 12/03 |
| 9,407,624 B1* | 8/2016 | Myers | H04L 41/28 |
| 9,521,145 B2 | 12/2016 | Bhatt et al. | |
| 9,807,621 B1 | 10/2017 | Hui et al. | |
| 9,955,526 B1* | 4/2018 | Yu | H04W 12/068 |
| 10,057,227 B1 | 8/2018 | Hess et al. | |
| 10,142,122 B1* | 11/2018 | Hill | H04L 12/2807 |
| 10,382,203 B1 | 8/2019 | Loladia et al. | |
| 10,397,013 B1* | 8/2019 | Hill | H04L 12/281 |
| 10,531,299 B1* | 1/2020 | Osborn | G01S 5/0244 |
| 10,764,128 B2 | 9/2020 | Kozura et al. | |
| 10,972,916 B2 | 4/2021 | Duo | |
| 11,128,612 B1 | 9/2021 | Loladia et al. | |
| 11,638,149 B2 | 4/2023 | Duo et al. | |
| 2004/0266449 A1* | 12/2004 | Smetters | H04L 63/062 455/452.1 |
| 2006/0010199 A1* | 1/2006 | Brailean | H04L 65/762 709/204 |
| 2007/0070943 A1* | 3/2007 | Livet | H04W 72/0446 370/329 |
| 2007/0275701 A1* | 11/2007 | Jonker | H04W 48/16 455/414.1 |
| 2008/0063204 A1* | 3/2008 | Braskich | H04L 9/0822 380/270 |
| 2008/0101291 A1 | 5/2008 | Jiang et al. | |
| 2009/0077601 A1* | 3/2009 | Brailean | H04L 65/61 725/109 |
| 2009/0307343 A1 | 12/2009 | Kumagai | |
| 2010/0122330 A1 | 5/2010 | McMillan et al. | |
| 2011/0055558 A1* | 3/2011 | Liu | H04L 9/0637 713/160 |
| 2011/0138183 A1 | 6/2011 | Reddy et al. | |
| 2011/0211511 A1 | 9/2011 | Bakthavathsalu | |
| 2012/0190341 A1* | 7/2012 | Gupta | H04L 63/0853 455/411 |
| 2013/0152169 A1* | 6/2013 | Stuntebeck | H04L 67/51 726/4 |
| 2013/0318343 A1 | 11/2013 | Bjarnason et al. | |
| 2014/0040618 A1* | 2/2014 | Liu | H04L 9/0891 713/168 |
| 2014/0071837 A1 | 3/2014 | Werb et al. | |
| 2014/0115673 A1 | 4/2014 | Haynes et al. | |
| 2015/0065093 A1 | 3/2015 | Schmidt et al. | |
| 2015/0180842 A1 | 6/2015 | Panther | |
| 2015/0244706 A1 | 8/2015 | Grajek et al. | |
| 2015/0372875 A1* | 12/2015 | Turon | H04L 69/16 370/254 |
| 2015/0372876 A1* | 12/2015 | Turon | H04W 12/37 370/254 |
| 2015/0373691 A1* | 12/2015 | Turon | H04L 63/166 370/329 |
| 2015/0373750 A1* | 12/2015 | Turon | H04W 12/009 370/254 |
| 2015/0373751 A1* | 12/2015 | Turon | H04L 63/10 370/254 |
| 2015/0373752 A1* | 12/2015 | Turon | H04W 76/10 370/254 |
| 2015/0373753 A1* | 12/2015 | Turon | H04W 12/009 370/254 |
| 2016/0029290 A1* | 1/2016 | Turon | H04W 72/51 370/312 |
| 2016/0037573 A1* | 2/2016 | Ko | G06F 3/012 455/41.2 |
| 2016/0095153 A1 | 3/2016 | Chechani et al. | |
| 2016/0105424 A1 | 4/2016 | Logue et al. | |
| 2016/0134932 A1 | 5/2016 | Karp et al. | |
| 2016/0147506 A1 | 5/2016 | Britt et al. | |
| 2016/0182459 A1 | 6/2016 | Britt et al. | |
| 2016/0219039 A1 | 7/2016 | Houthooft et al. | |
| 2016/0294828 A1 | 10/2016 | Zakaria | |
| 2016/0295364 A1 | 10/2016 | Zakaria | |
| 2016/0349127 A1* | 12/2016 | Britt | H04L 67/12 |
| 2016/0352729 A1 | 12/2016 | Malik | |
| 2017/0006643 A1 | 1/2017 | Zakaria et al. | |
| 2017/0048280 A1 | 2/2017 | Logue | |
| 2017/0169640 A1 | 6/2017 | Britt | |
| 2017/0171200 A1 | 6/2017 | Bao et al. | |
| 2017/0171747 A1 | 6/2017 | Britt et al. | |
| 2017/0346836 A1 | 11/2017 | Holland et al. | |
| 2017/0347264 A1 | 11/2017 | Holland et al. | |
| 2017/0359417 A1 | 12/2017 | Chen et al. | |
| 2018/0007140 A1 | 1/2018 | Brickell et al. | |
| 2018/0019929 A1* | 1/2018 | Chen | H04L 51/18 |
| 2018/0063714 A1 | 3/2018 | Stephenson | |
| 2018/0091506 A1 | 3/2018 | Chow et al. | |
| 2018/0102032 A1 | 4/2018 | Emmanuel et al. | |
| 2018/0124039 A1 | 5/2018 | Gajek et al. | |
| 2018/0189507 A1* | 7/2018 | Wakai | H04L 9/088 |
| 2018/0262497 A1* | 9/2018 | Raje | G06F 21/35 |
| 2018/0270904 A1 | 9/2018 | Swengler | |
| 2018/0293367 A1* | 10/2018 | Urman | G06F 21/32 |
| 2018/0314808 A1* | 11/2018 | Casey | G06F 21/105 |
| 2018/0317266 A1 | 11/2018 | Britt et al. | |
| 2019/0028467 A1 | 1/2019 | Oberheide et al. | |
| 2019/0028988 A1* | 1/2019 | Yao | H04W 12/06 |
| 2019/0037613 A1 | 1/2019 | Anantharaman et al. | |
| 2019/0087568 A1* | 3/2019 | Kim | H04L 41/12 |
| 2019/0089806 A1 | 3/2019 | Desphande | |
| 2019/0109713 A1* | 4/2019 | Clark | G06F 16/182 |
| 2019/0132303 A1 | 5/2019 | Kurian | |
| 2019/0150134 A1 | 5/2019 | Kakinada et al. | |
| 2019/0238539 A1 | 8/2019 | Arora | |
| 2019/0245713 A1* | 8/2019 | Lo | H04L 12/2834 |
| 2019/0253243 A1 | 8/2019 | Zimmerman et al. | |
| 2019/0253893 A1 | 8/2019 | Hodroj | |
| 2019/0259260 A1* | 8/2019 | Amini | G08B 13/1966 |
| 2019/0350021 A1 | 11/2019 | Blum | |
| 2019/0357023 A1* | 11/2019 | Park | H04L 12/2809 |
| 2019/0386981 A1 | 12/2019 | Ramesh Kumar et al. | |
| 2020/0007607 A1 | 1/2020 | Maxilom et al. | |
| 2020/0044851 A1 | 2/2020 | Everson et al. | |
| 2020/0068483 A1 | 2/2020 | Likar et al. | |
| 2020/0092701 A1* | 3/2020 | Arnberg | H04M 1/72415 |
| 2020/0099896 A1 | 3/2020 | Galvin et al. | |
| 2020/0154448 A1 | 5/2020 | Wilmunder | |
| 2020/0169460 A1 | 5/2020 | Bartlett et al. | |

(56) References Cited

U.S. PATENT DOCUMENTS

| | | |
|---|---|---|
| 2020/0169549 A1 | 5/2020 | Smith |
| 2020/0186998 A1 | 6/2020 | Smith et al. |
| 2020/0304372 A1 | 9/2020 | Henry et al. |
| 2020/0336476 A1 | 10/2020 | Polese Cossio et al. |
| 2020/0344599 A1 | 10/2020 | Duo |
| 2020/0344608 A1 | 10/2020 | Duo |
| 2020/0396613 A1 | 12/2020 | Duo |
| 2021/0056179 A1 | 2/2021 | Hiratsuka |
| 2021/0068198 A1 | 3/2021 | Michielsen et al. |
| 2021/0227391 A1 | 7/2021 | Duo |
| 2022/0046397 A1 | 2/2022 | Collins et al. |
| 2023/0362645 A1 | 11/2023 | Duo et al. |

FOREIGN PATENT DOCUMENTS

| | | | | |
|---|---|---|---|---|
| CN | 1020804200 | | 11/2012 | |
| CN | 1020804201 | | 11/2012 | |
| CN | 103888941 A | * | 6/2014 | .......... H04W 12/003 |
| CN | 105207987 | | 12/2015 | |
| CN | 106100848 | | 11/2016 | |
| CN | 109787825 A | * | 5/2019 | |
| JP | 2016072716 | | 5/2016 | |
| KR | 20070082209 A | * | 8/2007 | |
| KR | 2016091624 A | * | 8/2016 | ............ G06Q 50/01 |
| KR | 2018-0094985 | | 8/2018 | |
| KR | 20190105776 | | 9/2019 | |
| TW | 201743625 | | 12/2017 | |
| TW | 201810099 | | 3/2018 | |
| WO | WO 2017/053048 | | 3/2017 | |
| WO | WO-2017126282 A1 | * | 7/2017 | ............ G06F 13/00 |
| WO | WO-2018208289 A1 | * | 11/2018 | ........... H04L 9/0894 |

OTHER PUBLICATIONS

Akyildiz et al., Ian F., Wang, Xudong, Wang, Weilan, "Wireless mesh networks: a survey", Science Direct, Computer Networks Jan. 1, 2005.

U.S. Appl. No. 16/404,655 Office Action dated Jan. 15, 2021.
"Building a Rurul Wireless Mesh Network" by David Johnson, Karel Matthee, Dare Sokoya, Lawrence Mboweni, Ajay Makan, and Heng Kotze, pp. 44; Oct. 30, 2007.
"Cognitive Wireless Mesh Networks with Dynamic Spectrum Access", by Kaushik R. Chowdhury, Student Member, IEEE, and Ian F. Akyildiz, Fellow, IEEE. IEEE Journal on Selected Areas In Communications, vol. 26, No. 1, Jan. 2008, pp. 14.
U.S. Appl. No. 16/404,655 Final Office Action dated Apr. 8, 2021.
U.S. Appl. No. 16/397,935 Office Action dated Jul. 2, 2020.
Bontu, Chandra S., Peryalwar, Shalini, and Pecen, Mark; "Wireless Wide-Area Networks for Internet of Things", IEEE Vehicular Technology Magazine, IEEE Xplore, Published Jan. 31, 2014, 10 pages.
Khudoyberdiev et al., Azimbek; "A Novel Approach towards Resource Auto-Registration and Discovery of Embedded Systems Based on DNS", Electronics, Published Apr. 17, 2019.
U.S. Appl. No. 16/404,655 Office Action dated Sep. 1, 2021.
U.S. Appl. No. 17/223,526, Zhuangzhi Duo, Instant Secure Wireless Network Setup, filed Apr. 6, 2021.
Al-Fairuz et al., Mohamed, "Multi-channel, Multi-level Authentication for More Secure eBanking" pp. 8; Jul. 3, 2017.
Renaud et al., Karen "A Support Architecture For Multichannel, Multifactor Authentication" pp. 9; Apr. 2, 2014.
Willeke, Jim; "Multiple-channel Authentication", pp. 2, revised on Jul. 3, 2017.
U.S. Appl. No. 16/404,655 Final Office Action dated Apr. 8, 2022.
U.S. Appl. No. 16/404,655 Final Office Action dated Dec. 19, 2022.
U.S. Appl. No. 16/404,655 Office Action dated Jul. 27, 2022.
U.S. Appl. No. 16/911,111 Office Action dated Aug. 3, 2022.
U.S. Appl. No. 16/404,655 Office Action mailed Oct. 3, 2023.
U.S. Appl. No. 16/911,111 Final Office Action mailed Apr. 6, 2023.
U.S. Appl. No. 16/911,111 Office Action mailed Jul. 27, 2023.

* cited by examiner

ESTABLISHING SIMULTANEOUS MESH NODE CONNECTIONS

CROSS-REFERENCE TO RELATED APPLICATIONS

The present application claims the priority benefit of U.S. provisional application No. 62/942,809 filed Dec. 3, 2019 and entitled "Establishing Simultaneous Mesh Node Connections," the disclosure of which is incorporated herein by reference. The present application is also a continuation-in-part and claims the priority benefit of U.S. patent application Ser. No. 16/404,655, filed May 6, 2019, which is a continuation-in-part and claims the priority benefit of U.S. patent application Ser. No. 16/397,935, filed Apr. 29, 2019.

BACKGROUND OF THE INVENTION

Field of Invention

The present invention generally relates to configuring a wireless network. More specifically, the present invention relates to simultaneously setting up multiple wireless devices to communicate via wireless mesh network.

Description of the Related Art

Every day the use of wireless networks is expanding. Various vendors provide redundant wireless links that allow wireless data communications to be switched between different pieces of computer hardware as needed. For example, communications may initially be passed via a first wireless access point only to have those communications switched and passed via a second wireless access point should the first wireless access point fail or become overloaded with traffic. Communications may be switched or 'handed off' from the first to the second wireless access point when a mobile device is moved from one place to another. Wireless mesh networks predominantly use communications consistent with one of the 802.11 (or "Wi-Fi") wireless communication standards. Because of this, 802.11 communication channels are a preferred type of communication channel used in wireless mesh networks.

The constituency of any given network may vary significantly. For example, a first wireless network may include two wireless access points and a second wireless network may include dozens of wireless access points. The two networks may allow communication amongst one another by way of one or more of the foregoing access points.

A local network topology in which the infrastructure (e.g. bridges, switches, and other infrastructure devices) connect directly, dynamically, and non-hierarchically to as many other nodes as possible and cooperate with one another to efficiently route data from/to clients is generally referred to as a mesh network. This lack of dependency on one node allows for multiple nodes to participate in the relay of information. Once properly configured, mesh networks can dynamically self-organize and re-configure, which can reduce maintenance overhead. The ability to re-configure also enables dynamic distribution of workloads, particularly in the event a failure in the network. Individual access points in the network may be referred to as mesh nodes, mesh points, or mesh portals. Mesh networks can also allow for integration with hubs, routers, or switches in conventional wired networks (and the traffic communicated thereupon) or otherwise bypass the same by performing functions consistent with a wired hub, router, or switch.

Initially—and properly—setting up and configuring a wireless mesh network can be time consuming not to mention inefficient and error prone. Failure to properly configure a network can also lead to security lapses, network instability, or problems with scalability. In some instances, once a wireless mesh network is setup, adding additional wireless access points to that network may not be readily achieved without significant human intervention and the other inefficiencies and problems referenced above.

There is a need in the art for methodologies that can effectuate the secure installation, provisioning, and configuration of wireless access points and other devices that communicate with a wireless mesh network. There is a further need for registering and storing wireless mesh node configuration information such that new mesh nodes can be securely added to an existing wireless mesh network without manual intervention and in a time appropriate fashion.

SUMMARY OF THE CLAIMED INVENTION

In an embodiment of the presently claimed invention, a method includes a user device that scans a first code associated with a first wireless mesh node and may include the user device scanning a second code associated with a second wireless mesh node. The scanning of the first and the second code results in information unique to the first wireless mesh node and the second wireless mesh node being received at the user device. This method also includes the user device communicating with the first and the second wireless mesh node using low power wireless communications and sending registration information to a registration computer via a secure communication channel. The registration information sent to the registration computer includes information that is unique to the first wireless mesh node and information that is unique to the second wireless mesh node. After the registration information is received at the registration computer, a registration complete message is received by the user device and then the first and the second wireless mesh nodes may form at least a portion of a wireless mesh network.

In a second claimed embodiment, a non-transitory computer-readable storage medium is claimed where a processor executes instructions out of a memory. The executed instructions result in scanning a first code associated with a first wireless mesh node and a second code associated with a second wireless mesh node. The scanning of the first and the second code results in information unique to the first wireless mesh node and the second wireless mesh node being received at the user device. Registration information is sent to a registration computer via a secure communication channel. The registration information sent to the registration computer includes information that is unique to the first wireless mesh node and information that is unique to the second wireless mesh node. After the registration information is received at the registration computer, a registration complete message is received by the user device and then the first and the second wireless mesh nodes may form at least a portion of a wireless mesh network.

A third claimed embodiment includes an apparatus that scans a first code associated with a first wireless mesh node and a second code associated with a second wireless mesh node. The scanning of the first and the second code results in information unique to the first wireless mesh node and the second wireless mesh node being received. This apparatus includes a low power communication interface that sends and receives data using low power wireless communications and includes a first type of communication channel that securely sends registration information to a registration computer. The registration information sent to the registration computer includes information that is unique to the first wireless mesh node and the second wireless mesh node. After the registration information is received at the registration computer, a registration complete message is received and then the first and the second wireless mesh nodes may form at least a portion of a wireless mesh network.

DETAILED DESCRIPTION

The present disclosure relates to securely setting up mesh networks in a manner that does not require significant investments of physical hardware and further avoiding the unnecessary or excessive transmission of unencrypted information wirelessly from or to mesh devices when a mesh network is setup. Embodiments of the present invention allow a user to more easily install multiple mesh nodes using simplified methods. These methods may allow a user to specificity a custom profile that may include rules that identify how mesh network identifiers (IDs) are used, that identify passcodes/passphrases assigned to a particular network, or that allow multiple mesh nodes to be added to a wireless mesh network in parallel. The inventive methods disclosed herein may also identify types of traffic that may be passed through particular 802.11 radio channels or may identify may identify parameters that control how traffic is switched between devices in wireless mesh network. Dual factor verification may also be used as part of a process that allows a wireless mesh network to be setup more securely.

Embodiments of the present invention may allow for a computer that receives registration information and that stores that registration information in a database. This registration information may be cross-referenced with a profile associated with a network configuration, with a customer license, and with an identifier that identifies a wireless mesh network. In certain instances, a customer license identifier may be the wireless mesh network identifier. Profiles may include configuration preferences of a wireless mesh network and may identify software components that may be installed at particular mesh nodes according to those configuration preferences. Onboarding process (registering and configuring nodes) may store registration information and configuration information in a database at a computer in the cloud or that is accessible via the Internet. This stored information may be used to easily create or expand a wireless mesh network.

Figure 1:
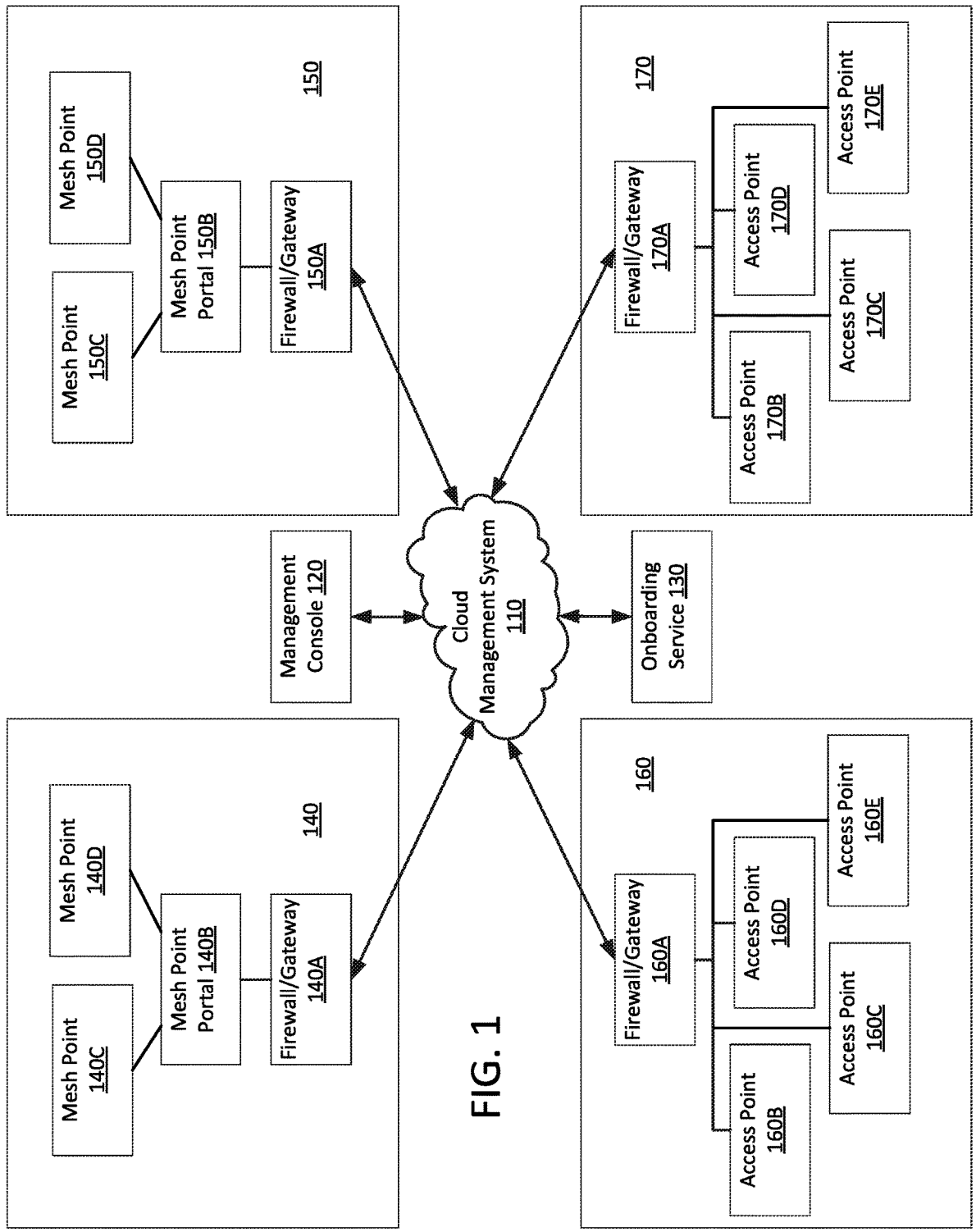
FIG. 1 illustrates a system that may be used to efficiently configure computing devices at a wireless mesh network.

FIG. 1 illustrates a system that may be used to efficiently configure computing devices at a wireless mesh network. FIG. 1 includes a management system 110 that may reside in a cloud computing environment. Management system 110 may be accessed via various types of computer network known in the art including both wired and wireless. Cloud management system 110 may perform functions associated with the creation or expansion of specific wireless mesh networks. Cloud management system 110 may store wireless mesh node serial numbers and configuration information of a wireless mesh network. The cloud management system 110 of FIGS. 1 and 510 of FIG. 5 may permanently register particular wireless mesh node serial numbers with a particular customer or with a particular mesh node configuration or topology at a customer site.

FIG. 1 includes management console 120 and onboarding service 130 that may be part of management system 110. Management console program code associated with management console 120 may allow a processor to receive and process information from cloud management system 110 when network configurations or network management rules are set. Program code of onboarding service 130 may allow information relating to a network configuration to be stored in a database that cross-references customer information with mesh node device identifying information, and with identifiers that identify computing devices that are authorized to communicate over a particular mesh network. Program code of management console 120 may also allow administrators to set policies or preferences relating to a particular mesh network via a user interface or graphical user interface (GUI). As such, cloud management system 110, management console 120, and onboarding service 130 may function in a manner consistent with the cloud management system 510 of FIG. 5.

FIG. 1 also includes various sets of networked clusters of computing devices 140, 150, 160, and 170. A first set of networked computing devices 140 includes firewall/gateway 140A, mesh portal 140B, and mesh points 140C & 140D. A second set of networked computing devices 150 includes firewall/gateway 150A, mesh portal 150B, and mesh points 150C & 150D. A third set of networked computing devices 160 includes firewall/gateway 160A and access points 160B, 160C, 160D & 160E (160B-160E). A fourth set of networked computing devices 170 includes firewall/gateway 170A and access points 170B, 170C, 170D & 170E (170B-170E).

Mesh portals consistent with the present disclosure may wirelessly communicate with a plurality of wireless mesh points and over a wired network. A mesh portal may act as a gateway between wireless mesh points and a wired local area network. A mesh portal may broadcast transmissions that include a mesh identifier (MSSID) and a cluster name that advertise the wireless network to mesh points that are configured to operate as members of a particular wireless mesh network. A mesh point may also include a cellular (e.g. 3G, 4G, LTE, or 5G) link or more than one mesh node in a mesh network may be configured to operate as a redundant mesh point that uses a wired or a wireless network connection.

The terms "access point" or "wireless access point" in the present disclosure refer to a device that may be wirelessly communicatively coupled to a computer directly with or without wireless communications passing through another wireless device. As such, the terms "access point" or "wireless access point" may refer to either a mesh portal or mesh point.

The term "mesh portal" may relate to a wireless device that performs functions that a "mesh point" need not perform. Both mesh portals and mesh points may perform functions consistent with a wireless access point because both mesh portals and mesh points may act as a wireless access point that directly wirelessly communicates with a computer. The term "mesh node" in the present disclosure may be used to refer to either a mesh portal or a mesh point that uses wireless communications to transmit and receive wireless computer network messages and data.

The terms "firewall" or "gateway" in the present disclosure may refer to computing devices that communicate over wired network connections. A mesh node may, however, include functionality consistent with a firewall or gateway. Functions conventionally associated with a firewall or gateway may be performed by a mesh portal or by mesh point. In these instances, a mesh portal or a mesh point may perform functions consistent with evaluating content ratings, deep packet inspection, or may include anti-virus program code.

A mesh portal may be configured to transmit and receive data network communication traffic between two different types of computer network, for example, between a network that communicates over wires and a network that uses wireless 802.11 signals. Alternatively or additionally, a mesh portal may transmit and receive data network communication traffic between a cellular network and an 802.11 network. Mesh points, however, may be limited to receiving and transmitting network traffic wirelessly over a single type of network, for example, over an 802.11 network. While mesh portals include different functionality as compared to a mesh point, certain mesh points may be configured to assume the role of a mesh portal.

Once configured, mesh points consistent with the present disclosure may communicate using wireless 802.11 communications only, or some of these mesh points may be configurable to be promoted to assume the functionality of a wireless mesh portal. While communications in a mesh network may be sent through any number of mesh points until those communications reach a mesh portal, most mesh points may typically be located within three hops of a mesh portal. Furthermore, a number of mesh portals that communicate with a mesh point may be limited by a rule or setting. For example, a rule may limit a number of mesh portals connected to a particular mesh portal to eight or another rule may limit a number of hops to three.

The mesh point portals (140B & 150B), mesh points (140 C/D & 150 C/D) of FIG. 1 may be wireless mesh nodes that allow mobile devices or other computers to redundantly connect to networks 140 or 150. For example, a user device may initially connect to network 140 using mesh point 140C. Communications may later be sent to mesh point 140D. This may occur when mesh point 140C is unreliable, fails, is overloaded, or when a signal strength of mesh point 140C is weaker than the signal strength of mesh point 140D.

The mesh points illustrated in FIG. 1 may include similar functionality as functionality performed by a mesh portal. Mesh point portals may include additional functionality that may not be provided by a mesh point in a given network. For example, mesh point portal 140B may be able to send transmissions over a wired network to firewall/gateway 140A. Alternatively or additionally, mesh point portals may be configured to communicate with other computing devices wirelessly.

Mesh point portal 140A may communicate with cloud management system 110 or with other devices via a cellular network, while mesh point portal communicates with other devices (such as user devices, mesh point 140C, or mesh point 140D) using standard 802.11 wireless communications. Computing devices associated with networks 160 or 170 include firewall/gateway (160A & 170A) and various access points (160B-160E & 170B-170E). Each of these different access points may include wireless communication capabilities like the mesh points 140C/140D and mesh portal 140B of network 140, for example.

Computing devices connecting to a particular mesh network and mesh nodes (mesh points or mesh portals) may be setup and configured using methods that increase security by using shared secrets or that use privileged communication pathways. These shared secrets or privileged communication pathways may be difficult or impossible to observe (snoop) or hack. For example, a particular computing device may be configured to communicate with cloud management system 110 of FIG. 1 via a secure tunnel during a configuration process that also uses a different communication technique to share information between a mesh point and a user device. This different communication technique may include sending information between the mesh point and the user device via a short distance/low power communication connection, such as a Bluetooth® or Bluetooth® communication connection. Data transmitted via this low power communication connection could be difficult to snoop or hack in instances when a hacker is physically located out of range of a low power data communication signal.

Processes for configuring and setting up devices in a wireless mesh network may also include two-factor authentications, where secret information is sent to a user device. For example, a message that includes secret information may be sent to an email address or may be sent in the form of a text message to the user device. This secret information may then be used to secretly validate or identify that the computing device can be allowed to communicate with devices at a wireless mesh network. A user device may provide a secret code that was received via a text message from a computer located at the cloud or Internet to a wireless access point. This secret information may be provided to a user device via a type of communication channel that is different from a type of communication channel that communicates other information. One communication channel type may be a cellular communication channels and another type of communication channel may be a wireless 802.11 channel.

Once validated, a user device may be able to connect to a particular mesh network from anywhere. For example, a configuration at a validated user device may allow that user device to connect to the mesh network via a cellular connection when that user device is located at a location far from an 802.11 mesh network. In such an instance, the user device may communicate with other devices that are located within a zone, where these other devices may communicate via the mesh network using communications consistent with an 801.11 WI-FI communication channel.

When a mesh network is configured, communications may pass from one or more mesh nodes (mesh point or mesh portals) as those mesh nodes are provisioned with software or configured using onboarding service 130 of FIG. 1. Program code of onboarding service 130 may allow information relating to a network configuration to be stored in a database that cross-references customer information with mesh node device identifying information, and with identifiers that identify computing devices that are authorized to communicate over a particular mesh network. Because of this, onboarding service 130 may register serial numbers identifying particular wireless mesh nodes with a customer and with a network configuration specific to that customer.

Management consoles 120 may be used to organize and store data associated with particular mesh networks in a database. Data stored in such a database may cross-reference customer identifying information with machine (MAC) addresses/identifiers that identify mesh node devices that have been configured to operate in that particular customer's wireless mesh network. Data stored in this database may also cross-reference MAC addresses or other information that identifies computing devices that are authorized to connect to a particular customer's wireless mesh network. MAC addresses or other identifying information stored in the database may be copied to memories resident within a particular mesh network. After sets of configuration information are stored, additional mesh nodes may be added to the mesh network in a manner that requires little or no user intervention.

For example, a user device may scan a label, a bar code, a quick response (QR) code, or a near field data communication (NFC) tag/chip that identifies the new mesh node component. Once that new mesh node component has been identified and cross-referenced to a particular customer account, that new component may be provisioned with software and configured automatically. Low power data communications may allow an authorized user device to securely configure a single or a group of wireless access points. Such capabilities allow communications of a wireless mesh network to be secure, even when networks are initially configured or when new wireless access points are added to a wireless mesh network.

Whenever mesh nodes in a mesh network are powered on (boot up) they may communicate with each other when identifying best pathways that can be used to pass network communications. Different frequencies may be used to transmit 802.11 communications and these frequencies may be configured by one or more rules that direct certain types of communication traffic to a particular radio frequency. For example, communications that use 5 gigahertz (GHz) signals may be used to transfer network associated data and client traffic and communications that use 2.4 GHz signals may be used only for client data. Furthermore, each mesh node (mesh point or mesh portal) may be configured and provisioned according to a consistent profile according to one or more rules. Profiles for a certain mesh network may be stored in a memory associated with a user mobile device that participates in the registration and configuration of wireless mesh nodes or may be stored in a database at a server that administrates a registration or onboarding process.

Figure 2:
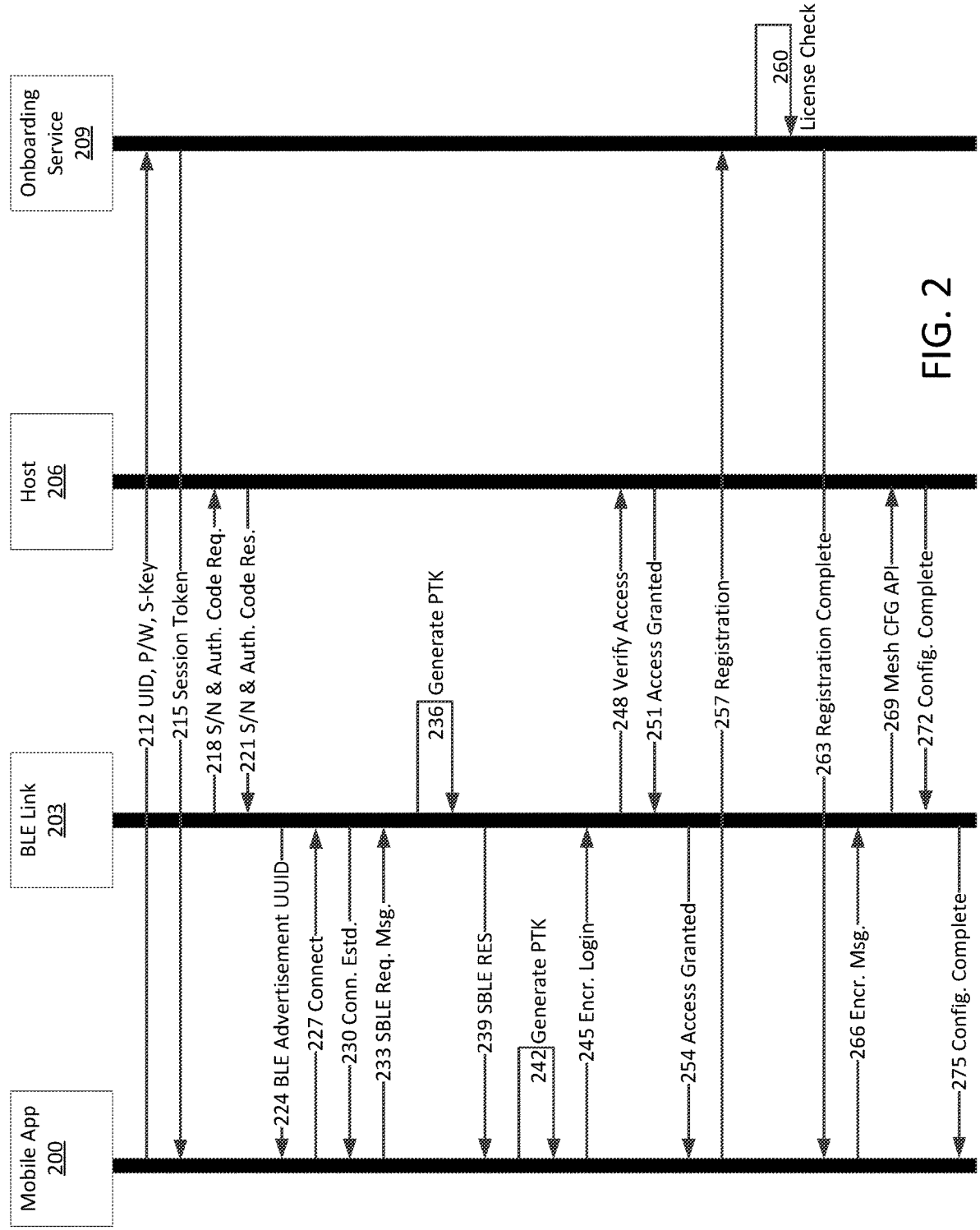
FIG. 2 illustrates communications that may be performed when one or more computing devices are registered and configured to communicate with a mesh network.

FIG. 2 illustrates communications that may be performed when one or more computing devices are registered and configured to communicate with a mesh network. FIG. 2 includes actions performed by a mobile device that may communicate with a host computer 206 via a short distance wireless link (such as a Bluetooth® or low power Bluetooth® communication link) 203. At least a portion of a process that registers mobile app 200 may be performed via operation of program code on onboarding service 209. Host computer 206 may be a computer at a customer site that communicates with a management system, such as cloud management system 110 of FIG. 1 when operations of onboarding service 130 of FIG. 1 or 209 of FIG. 2 are performed. Host 206 may be a wireless mesh node that performs function of BLE link 203 and host 206 and these different functions may be performed using different processors at the wireless mesh node. Instructions associated with onboarding service 130 of FIG. 1 or 550 of FIG. 5 may perform the same functions described in respect to onboarding service 209 of FIG. 2. Program code instructions associated with onboarding service 209 may be executed by a processor at a cloud computing device and program code residing at the mobile device may include instructions associated with mobile app 200. Instructions of onboarding service executed by a computer such as the cloud management system 110 of FIG. 1 or 510 of FIG. 5.

Figure 5:
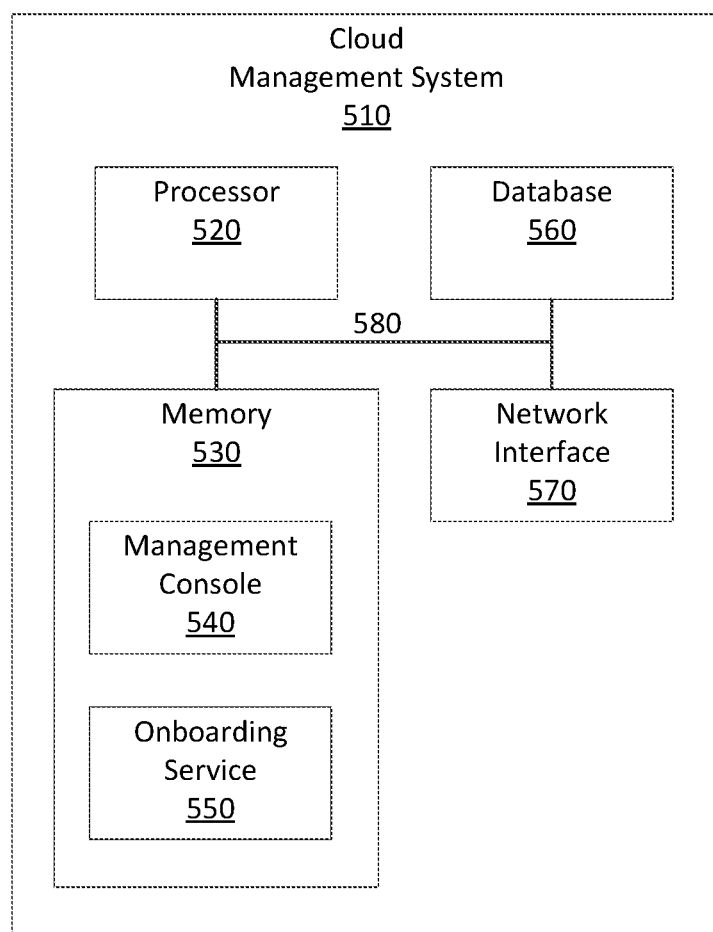
FIG. 5 illustrates components that may be included in a management system residing in the cloud or Internet that may provide information necessary to setup a wireless mesh network.

Initially, program code of mobile application 200 may prepare a message 212 to send to an onboarding service 209 performed by a cloud management system 110 or 510 of FIG. 1 and FIG. 5. This communication may be passed by communication mediums known in the art including wireless cellular communication links. Message 212 may be sent via a secure communication protocol, such as the secure hyper-text transfer protocol (HTTPS). By using a secure communication protocol, information may be securely provided to cloud management system 110 of FIG. 1 or 510 of FIG. 5 that executes program code consistent with onboarding service 209. Message 212 may be passed through host 206. Alternatively, message 212 may be passed directly to the computer executing the instructions of onboarding service 209, without passing through host 206. The computer executing instructions of onboarding service 209 may be the cloud management system 110 of FIG. 1 or the cloud management system 510 of FIG. 5. Message 212 may include a user identifier (UID), a password, and a security key. After the login information has been sent to the computer system that manages onboarding service 209, that management computer system may execute of the onboarding service 209 program code. These instructions may cause a unique session token to be sent to a mobile device executing instructions associated with mobile application 200. Mobile application 200 may include instructions that when executed by a processor at a mobile device to access a cloud management system, such as cloud management system 110 of FIG. 1 or 510 of FIG. 5.

Message 212 may be part of a process where a secure communication session is established between the computer executing onboarding service 209 and a mobile device executing program code of mobile application 200. Program code associated with onboarding service 209 may also use a two-factor authentication process to validate a user device before issuing a session token. For example, a cloud computing device (such as cloud management system 110 or 510 of FIG. 1 and FIG. 5) may send a text message, email, or voice (audio) message that includes a code that must be provided to the cloud computer before a session token is sent to a mobile device in communication 215 of FIG. 2. Communications between the mobile device executing instructions of mobile application 200, may allow cloud management system (110 or 510) to provide information via management console 120 of FIG. 1 or 540 of FIG. 5.

BLE link 203 may be coupled to a first processor at a wireless access point that communicates with a second processor at host 206. The first processor at the wireless access point may perform tasks including those associated with messages or processes 218, 221, 224, 227, 230, 233, 236, 239, 245, 248, 251, 254, 266, 269, 272, and 275 and the second processor at the host may perform tasks associated with, for example, messages or processes 218, 221, 248, 251, 269, and 272. Other low power data communication technologies may be used when a wireless mesh network is setup. For example, a proprietary wireless communication technique may be used or a high bandwidth short distance millimeter radio wave transducers. Processes performed by BLE link 203 and host 206 may be performed by a single device, such as a wireless mesh node and communications between BLE link 203 and host 206 may use a wired communications signals as opposed to wireless communication signals. When functions of BLE link 203 and host 206 are performed within a same computing device, functions of BLE link 203 and host 206 may be performed by different processors at that computing device.

A person configuring their wireless mesh network may then use their mobile device to scan a barcode, a quick response (QR) code, or a near field data communication (NFC) tag to obtain information associated with host 206. After the mobile user device has scanned a code or tag like that shown in FIG. 3, authentication information may be sent via short distance wireless link 203 to host 206 in communication 218 of FIG. 2. A response to that authentication request may be received in communication 221 of FIG. 2.

Authentication request 218 may include a serial number of host computer 206 and may include an authentication or authorization code. Authentication request 218 may be sent by circuitry, a chip, or a processor that communicates with a mobile device using Bluetooth® communications (BLE) link 203 and that communicates with a processor of host computer 206. Communication 221 is a response message that may pass the serial number of host computer 206 and the authentication code from the processor of host 206 back to the circuitry, the chip, or the processor of BLE link 203. Since communications sent via wireless link 203 are low power wireless signals, only devices within a particular distance of host 206 would be able to receive information sent via low power wireless link 203. The use of low power wireless link 203 allows devices to initiate a relatively secure registration process using communications that have a very limited range.

The mobile device used to setup a wireless mesh network may scan QR or other codes associated with several different wireless mesh nodes during a configuration process. As a result, different mesh nodes may be registered via an automated batch process or using processes that register these mesh nodes in a parallel or semi-parallel way. For example, QR codes of a first and a second wireless mesh node may be scanned by a mobile device. Afterwards, Bluetooth® communications between the mobile device and each respective mesh node may communicate information consistent with steps 218 and 221 of FIG. 2.

The first and second wireless mesh nodes may communicate in parallel with the mobile device by using different Bluetooth® connections, may communicate with the mobile device using interleaved communications, or may serially communicate with the mobile device. An example of interleaved communications includes an authorization code associated with the first mesh node being sent from the mobile device to the first mesh node after which the mobile device sends an authorization code associated with the second mesh node to the second mesh node before the mobile device receives a response message. From the perspective of the user, the overall process of registering or configuring these different mesh nodes appears to occur in parallel even when one or more communications of such a registration or configuration process may be performed using sequential communications, interleaved communications, or other techniques.

BLE link 203 may then broadcast advertisement messages 224 to devices within range of the low power BLE link 203. This advertisement may be in a format consistent with a low power Bluetooth® advertisement that may include an encoded universal unit identifier (UUID). This encrypted UUID may include an authorization code, a system status, and a serial number. The authorization code of message 224 may be the same authorization code associated with communications 218 and 221. The mobile application 200 at a mobile device may then compose a connect message 227. A Bluetooth® connection message 230 may then be sent to the mobile device when a secure low power/Bluetooth® communication session is established between the host 206 and the mobile device.

After the low power communication session has been established, mobile application 200 may then generate request message 233 to send to the BLE link 203 of FIG. 2. This request message may include a first random/pseudo random number (or first nonce). Next, a process at the BLE link 203 may generate a second random/pseudo random number (or second nonce) and may generate a pairwise temporary key (PTK) during process 236 of FIG. 2. This temporary key may have been generated using the first nonce, the second nonce, a machine (MAC) address of the mobile device, a MAC address of host 206, a serial number, or other information. This temporary key may also be created using a hash of information. The MAC address of the mobile device may have been provided to host 206 based on connect message 227 of FIG. 2. The various low power or Bluetooth® communications illustrated in FIG. 2 (e.g. communications 224, 227, 230, & 233) may be performed in parallel, may be performed using interleaved communications, or may be serially performed when multiple different mesh nodes are registered and configured.

BLE link 203 may then generate message 239 that includes a machine integrity code (MIC) and the second nonce. After message 239 is generated, it may be sent to the mobile device. Mobile application 200 may then extract the MIC and the second nonce from message 239 and a processor at the mobile device may generate the pairwise temporary key using information that may include the first nonce, the second nonce, the mobile device MAC, the host MAC, the serial number, the authentication code, or other information in process 242 of FIG. 2.

The processor at the mobile device may then compute its own version of the MIC and compare that re-computed MIC with the MIC included in message 239 when verifying the pairwise temporary key during process 242 of FIG. 2. The processor at the mobile device may then encrypt a login message that is sent to host 206 over BLE link 203. This encrypted login message may include a user name, a password, and an authentication code. Host 206 may then verify this login information during process 248 of FIG. 2.

Host 206 may then prepare an access granted message during process 251 that is sent to the mobile device as access granted message 254 of FIG. 2. The mobile device may then send registration message 257 to the cloud computer that executes instructions consistent with onboarding service 209. Message 257 may be sent over the secure tunnel to the cloud computer. Registration message 257 may include a user identifier (UID), the session token from message 215, a serial number, and an authentication code. Registration message 257 may also include settings set by a user accessing mobile application at a mobile or other computing device.

The cloud computer executing the instructions consistent with onboarding service 209 may validate the mobile device during process 260 to ensure that the user device is associated with a valid license or valid customer account. Step 260 may also validate information associated with a mesh node that includes BLE link 203 and host 206. This validation information may include a serial number of a mesh node device and an authorization code associated with the mesh node device. This validation process may include accessing a database that stores information that cross-references mesh node serial numbers with authorization codes.

When a particular mesh node device is manufactured, it may be assigned a serial number and an authorization code and this information may have been stored in the database as part of a manufacturing process associated with building or packaging a mesh node device. This information may also include a model number and/or a revision number and either of these model or revision numbers may be used to identify the capabilities of a particular mesh node device.

For example, a mesh node device may be assigned a serial number of A1234ADAD221 and an authorization code of Zebra221. This mesh node device may have been built as a model A1000Z and mesh node devices with model A1000Z may identify a processor type or an amount of non-volatile memory built within that mesh node device. Model number information may also be used to identify whether a particular mesh node device can be used as a mesh portal, a mesh point, or both. Mesh node serial number 1234ADAD221 may be a unique number assigned to only one single mesh node device. The validation process may access the database to retrieve an authorization code associated with serial number 1234ADAD221 and the retrieved authorization code Zebra221 may be compared with information received in registration message 257 of FIG. 2.

When this comparison identifies that a serial number and an authorization code included in registration message 257 matches the serial number and authorization code stored in the database, a particular mesh node may be validated as being an authentic mesh node. Information associated with a mobile device that sent registration message 257 may also be included in registration message 257 and this information may be used to associate that mobile device with the mesh node. In certain instances, this information associated with the mobile device may be used to register that mobile device with onboarding service 209 automatically after mesh node serial number and authentication codes have been authenticate.

Alternatively, the information associated with the mobile device may be a unique number such as a serial number or MAC of the mobile device. This information, too, may have been assigned as part of an additional registration process that associates the mobile device with a particular customer or customer license. When an additional authentication process is used to register a particular mobile device may include the mobile device downloading mobile application 200 and may include the mobile device sending information that identifies a customer (e.g. using a customer identifier or number) that the mobile device may be associated with a wireless mesh network. Information that identifies the mobile device and the customer may also be stored in the database. In such instances, license check process 260 may include associating the mesh node identified by the serial number and authentication code included in registration message 257 with the customer. As such, information stored in the database may cross-reference a mobile device, with a customer identifier, with a mesh node, and with a mesh network owned by the customer identified by the customer identifier.

The cloud computer may store information that associates host 206 and the user device serial number (or MAC address/identifier) with a particular wireless mesh network and with a particular customer. After the mobile device, the mesh node, or both are authenticated, onboarding service 209 may then prepare a message to send to the mobile device and the cloud computer may then send a registration complete message 263 to the mobile device. After receiving the registration complete message, the mobile application 200 at the mobile device may then send an encrypted message 266 via wireless link 203. This encrypted message may include an encrypted version of the pairwise temporary key that was calculated during process 242 of FIG. 2.

After encrypted message 266 is sent, that message may be decrypted according to an encryption standard using the pairwise temporary key generated during process 236 of FIG. 2. This decryption may be performed during process 269 of FIG. 2. This decryption may be performed using an application program interface (API) call that may be referred to as a mesh configuration API call. Process 269 may also include setting a configuration after which process 272 may compose a configuration complete message 275 to send to the mobile device.

After completing this configuration process, the mobile device executing program code consistent with mobile application 200 may securely communicate with computing devices at the Internet via one or more different mesh nodes devices included in the newly configured mesh network. Host 206 may be a mesh point or a mesh point portal like those illustrated in FIG. 1. Operation of mobile application 200 may allow a mobile device to find and identify all compatible mesh points or mesh portals that are associated with a mesh network. In certain instances program code of mobile application 200 may allow a mobile device to communicate with compatible mesh nodes (mesh points or portals) when multiple mesh nodes are registered, provisioned with software, or simultaneously configured.

Embodiments of the present invention may allow a user to choose which mesh nodes can join a network. That user may specify a custom profile that may include rules that may identify how mesh network identifiers (IDs) are used or that identify passcodes/passphrases assigned to a particular network. These methods may identify types of traffic that may be passed through particular 802.11 radio channels, or other parameters that may control how traffic is switched between devices in a particular wireless mesh network. Combined with dual factor verification and the use of low power wireless communication channels ease deployment and expansion of a network according to the needs of users that are responsible for establishing and maintaining specific wireless mesh networks.

Figure 3:
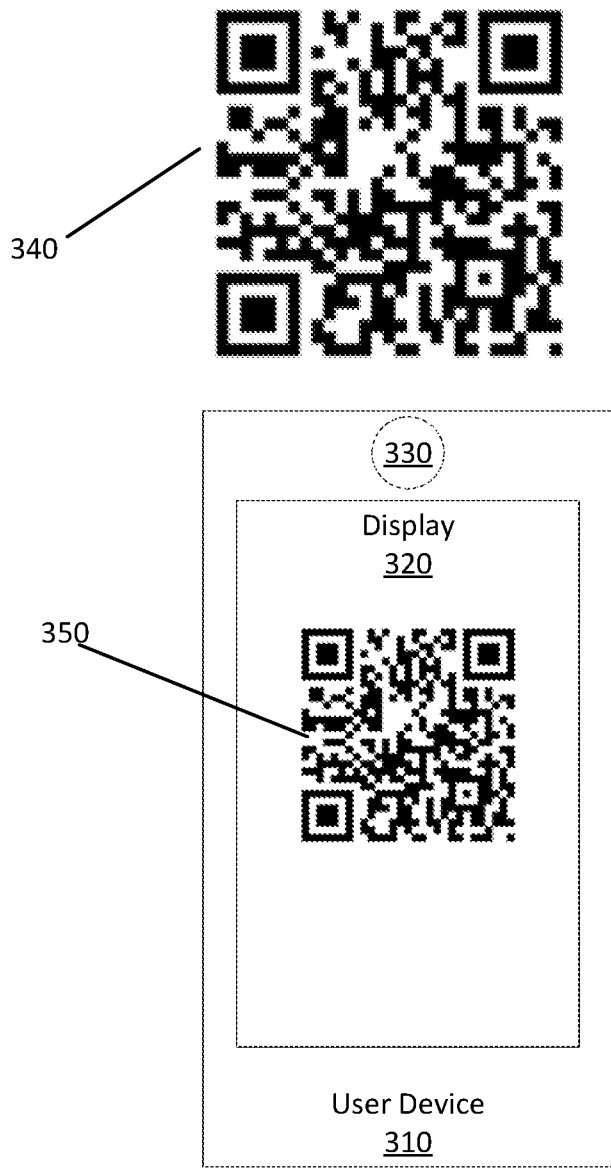
FIG. 3 illustrates a user device that acquires an image of a Quick Response (QR) code when configuring a wireless mesh network.

FIG. 3 illustrates a user device that acquires an image of a Quick Response (QR) code when configuring a wireless mesh network. FIG. 3 includes user device 310 that acquires an image of QR code 340 using camera/sensor 330 at user device 310. User device 310 also includes display 320 that may display an image 350 of QR code 340 or other associated data after the corresponding data has been acquired. The QR code 340 illustrated in FIG. 3 may be a code imprinted on enclosure of a wireless access point (mesh node) or QR code 340 may be imprinted on a box that contained the wireless access point (mesh node).

Once the code is acquired, user device 310 may communicate with the wireless access point when a wireless mesh network is setup, provisioned, or configured. A program application (like mobile application 200 of FIG. 2) executing at user device 310 may allow user device 310 to identify a serial number and authentication code associated with the wireless access point when sending communications to that wireless access point as illustrated in communications 218, 221, 224, 227, 230, and 233 of FIG. 2. These communications may use a low power communication interface that can only transmit signals within a limited range.

Once data corresponding to the QR code is processed by user device 310, user device 310 may perform steps consistent with FIG. 2 when setting up a wireless mesh network. Information transmitted by another type of wireless communication interface may be used to send information directly from user device 310 or via the wireless access point when registration details are sent to a computer in the cloud or Internet. These registration details may be used to associate a customer identifier with devices in a configured wireless mesh network. Furthermore, these registration details may be used to identify that user device 310 is authorized to access the wireless mesh network of that customer, even when user device 310 previously did not communicate with particular devices of a wireless mesh network.

For example, user device 310 may have been used to configure mesh nodes at an office in San Francisco that is associated with customer A. In an instance, where a user of user device 310 travels to an office of customer A in Los Angeles, user device 310 may be identified as being authorized to access the wireless 802.11 network of customer A at their Los Angeles office. Alternatively or additionally, user device 310 could access other devices at the wireless mesh network via a cellular communication interface, when user device 310 was located away from either the San Francisco or the Los Angeles office of customer A.

Instances when multiple wireless mesh nodes are registered or configured, QR codes from multiple different mesh nodes may be scanned by a mobile device. In such instances, each of a set of QR codes may be scanned by a mobile device as processes consistent with the present disclosure are performed. Each QR code for each respective mesh node may be unique or may include unique information. For example, each QR code may include information that identifies serial numbers and authentication codes that are unique to each respective mesh node that are added to a mesh network.

During installation of a new wireless mesh network or when expanding a wireless mesh network, nearby compatible wireless mesh devices may be identified along with respective capabilities of each respective wireless mesh device. A user may be able to select from a list of mesh devices identified using low power data communications when the mesh network is setup or expanded and each of the selected mesh devices may be configured according to a profile in a parallel rather than in a serial manner.

The scanning capability illustrated in respect to FIG. 3 may be used to identify mesh devices that should be configured as part of a mesh network or that are added to a mesh network. A user may also select a size of the mesh network and may set a topology of the mesh network. For example, particular mesh points may be initially configured to communicate with certain other specific mesh points, where each mesh node may be placed in a hierarchy that specifies at least initial settings relating to which mesh point is located how many hops from a particular mesh portal. These mesh points may also be configured to switch configurations based on other settings or parameters by using a program application, such mobile application 200 of FIG. 2. In instances where a user does enter settings related to the configuration of a wireless mesh network, that user may not be required to manually enter device information, such as device serial numbers or machine identifiers because all a user may have to do is to scan a quick response (QR) code to identify a wireless device that will be included in a wireless mesh network.

The onboarding of wireless devices in a wireless mesh network may include the registration of computing devices automatically with little or no user intervention. A user may not be required to manually enter device information as here again a user may simply scan a QR code that identifies a wireless mesh device. This QR code may also include an authorization code and other information that may be used during a registration or onboarding process. Registration or onboarding processes consistent with the present disclosure may include the storing of information that identifies a mesh portal, one or more mesh points, and wireless computing devices associated with a new wireless mesh network. Part of this onboarding process may include a server updating configurations at one or mesh devices according to a profile stored in memory.

Figure 4:
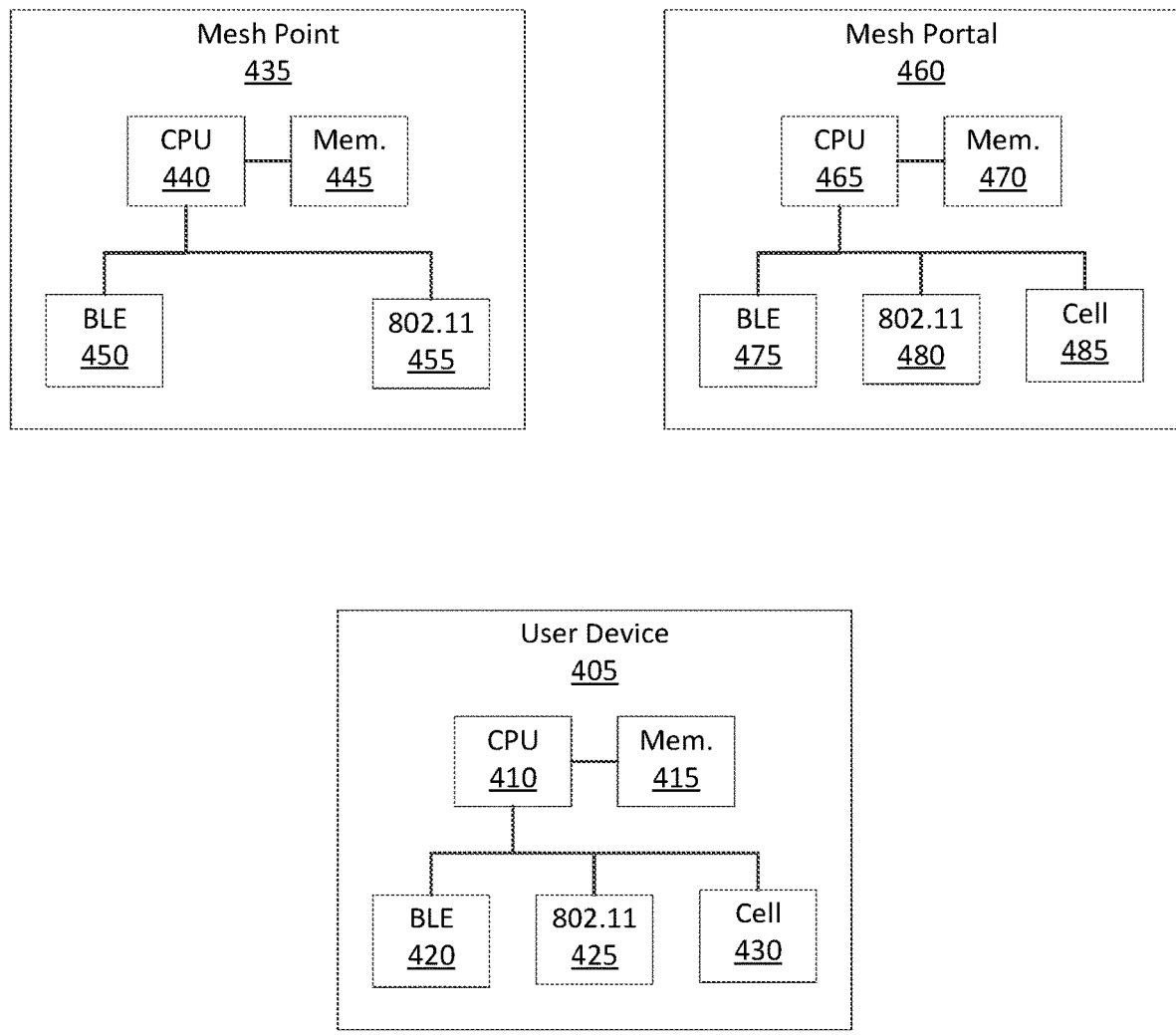
FIG. 4 illustrates different computing devices that may be configured to send communications with each other according to rules or policies consistent with the present disclosure when a wireless mesh network is setup.

FIG. 4 illustrates different computing devices that may be configured to send communications with each other according to rules or policies consistent with the present disclosure when a wireless mesh network is setup. FIG. 4 includes user device 405, mesh point 435, and mesh portal 460. User device 405 includes a processor/central processing unit (CPU) 410 that may execute instructions out of memory 415. User device 405 also includes communication interfaces of low power Bluetooth® interface 420, Wi-Fi 802.11 interface 425, and cellular interface 430.

User device 405 may be the same mobile device that executes instructions consistent with functions associated with mobile application 200 of FIG. 2. As such, user device 405 may communicate with low power data communication links (475/450) at mesh portal 435 or mesh portal 460 using BLE links 203 of FIG. 2. User device 405 may communicate with both mesh point 435 and mesh portal 460 using low power data communications after user device 405 scans respective QR or other codes of each of these respective mesh nodes 435 and 460, where each of the respective codes may include an identifier and an authorization code that are respectively unique to mesh point 435 and mesh portal 460.

The mesh point 435 of FIG. 4 includes processor/CPU 440 that may execute instructions out of memory 445. Mesh point 435 also includes Bluetooth® interface 450 and Wi-Fi 801.22 interface 455. Mesh point 435 may implement functions consistent with the various mesh points (140C, 140D, 150C, or 150D) discussed in respect to FIG. 1. Furthermore, the low power communication link 450 at mesh point 435 may communicate in a manner consistent with the BLE link 203 of FIG. 2. These Bluetooth® communications may be in parallel, may be interleaved, or may be sequential communications.

Mesh portal 460 includes processor/CPU 465 that may execute instructions out of memory 470. Mesh portal 460 also includes communication interfaces of low power Bluetooth® interface 475, Wi-Fi 802.11 interface 480, and cellular interface 485. Note that mesh portal 460 includes cellular communication interface 485, where mesh point 435 does not include a cellular communication interface. Mesh portal 460 may implement functions consistent with the various mesh portals (140BC or 150B) discussed in respect to FIG. 1. Furthermore, the low power communication link 475 at mesh portal 460 may communicate in a manner consistent with the BLE link 203 of FIG. 2.

Note that mesh portals and mesh points may include different capabilities as mesh portals may include functionality that allows the mesh portal to send network communications over cellular communication interface 485, where mesh point 435 may not include this functionality. In certain instances, mesh portals may include wired network interfaces that allow a mesh portal, like mesh portal 460 to send network communications over a wired computer network, where mesh point 435 may not include such functionality.

Alternatively, mesh point 435 may include a cellular communication interface or a wired that is disabled based on a mesh point configuration that is different from a mesh portal configuration. User device 405 may communicate with both mesh point 435 and with mesh portal 460 using a low power signals that have a limited range. For example, Bluetooth® interface 420 at mobile device 405 may communicate with mesh point 435 using Bluetooth® interface 450 and may communication with mesh point 460 via Bluetooth® interface 475 during a registration process. User device 405 may also communicate with mesh point 435 using 802.11 interface 425 at user device 405 and 802.11 interface 455 at mesh point 435. Alternatively or additionally, user device 405 may also communicate with mesh portal 460 using 802.11 interface 425 at user device 405 and 802.11 interface 480 at mesh portal 460.

In an instance where mesh point 435 fails, communications could "fail over" (switch) to mesh portal 460 or another mesh point (not illustrated in FIG. 4). Such a "fail over" process could include user device 405 forming a communication connection with either mesh portal 460 or with the other mesh point. Communications sent to a computer through a first mesh point may be switched to a second mesh point according to a set of rules that identify conditions when such communications should be switched. For example, a rule may identify that communications be switched to another mesh point when communications with a currently used mesh point is experiencing an error rate that meets or exceeds a threshold level.

Alternatively or additionally, switching rules may identify that a communication connection should be switched when a collision rate increases, when a particular mesh point has a greater than a threshold level measure of congestion, or such rules may dictate that a particular connection should be switched when another mesh node has a greater signal strength. In one example, a reduction in signal strength in communications associated with mesh point 435 may cause a communication connection to switch to another mesh point when that other mesh point has a stronger signal than mesh point 435.

Exemplary measures of congestion include, yet are not limited to an amount of time or average time required to send or receive communication packets, a number of devices connected to a particular mesh point, a number of communications or bytes being transmitted per unit time via particular mesh nodes, or a number of hops to a mesh portal. This number of hops may be associated with a number of mesh points through which a data packet passes until that data packet reaches a mesh portal. The switching capability included in wireless mesh networks consistent with the present disclosure allows either indoor or outdoor wireless networks to self-heal in a manner that is redundant, robust, and secure. This switching capability also allows traffic in a wireless mesh network to be re-configured according to any rules or policies as requirements change over time.

Embodiments of the invention may include instances of promoting a mesh point to assume functions of a mesh portal. This may occur when a particular mesh portal fails, when a greater than a threshold error rate is encountered, when an increased collision rate associated is observed, or when a measure of congestion associated with a mesh portal reaches a threshold level. The promotion of a mesh point to a mesh portal may include enabling functionality at a particular mesh point. In an instance when mesh point 435 is promoted, a cellular communication interface at mesh point 435 may be turned on (enabled) such that mesh point 435 could assume duties previously performed by mesh portal 460.

FIG. 5 illustrates components that may be included in a management system residing in the cloud or Internet that may provide information necessary to setup a wireless mesh network. The cloud management system 510 of FIG. 5 may implement functions consistent with the cloud management system 110 of FIG. 1 and may further implement functions consistent with onboarding service 209 of FIG. 2 or the onboarding service 130 of FIG. 1. The cloud management system 510 of FIG. 5 includes processor 520 that may execute instructions out of memory 530. Memory 530 may also store program code associated with management console 540 operations or with functions associated with onboarding service 550. Functions associated with management console 540 and onboarding service 550 may be identical to functions performed respectively by program code instructions of management console 120 and onboarding service 130 of FIG. 1. Management console program code 540 may allow processor 520 to receive and process information from a computer that sets network configurations or that sets network management rules. Program code of onboarding service 550 may allow information relating to a network configuration to be stored in database 560 that cross-references customer information with mesh node device identifying information, and with identifiers that identify computing devices that are authorized to communicate over a particular mesh network.

Cloud management system 510 of FIG. 5 may also include communication bus 580 that allows processor 520 to access data or instructions stored in memory 530 or in database 560. Instructions stored in database 560 may also include program code that may be executed at a mesh portal or mesh point that is consistent with methods and wireless mesh network configurations of the present disclosure. Management console program code 540 may also allow administrators to set policies or preferences relating to a particular mesh network. Management console 540 may also allow an administrator or user to identify, configure, and authorize new computing devices to access a particular mesh network. Note that processor 520 may also use communication bus 580 to send or receive data via communication interface 570. Network interface 570 may be either a communication interface that communicates with user devices using either wired or a wireless data communications. Here again, wired network communications maybe sent over an Ethernet compatible wired interface or these communications may be send over a cellular or wireless (WIFI) network.

Processor 520 may execute instructions out of memory 530 when operations consistent with management console 540 are performed, when information is stored in database 560, when operations consistent with onboarding service 550 are performed, or when communications are transmitted/received via network interface 570. Operations consistent with onboarding service 550 may include the same sorts of operations discussed in respect to onboarding service 209 of FIG. 2. For example, onboarding service 550 may use/receive login or device information over a secure channel (e.g. HTTPS), may use/provide unique session keys, and may perform device/mesh node registration & license checks consistent with operations associated with communications 218, 221, 257, 260, and 263 of FIG. 2.

Figure 6:
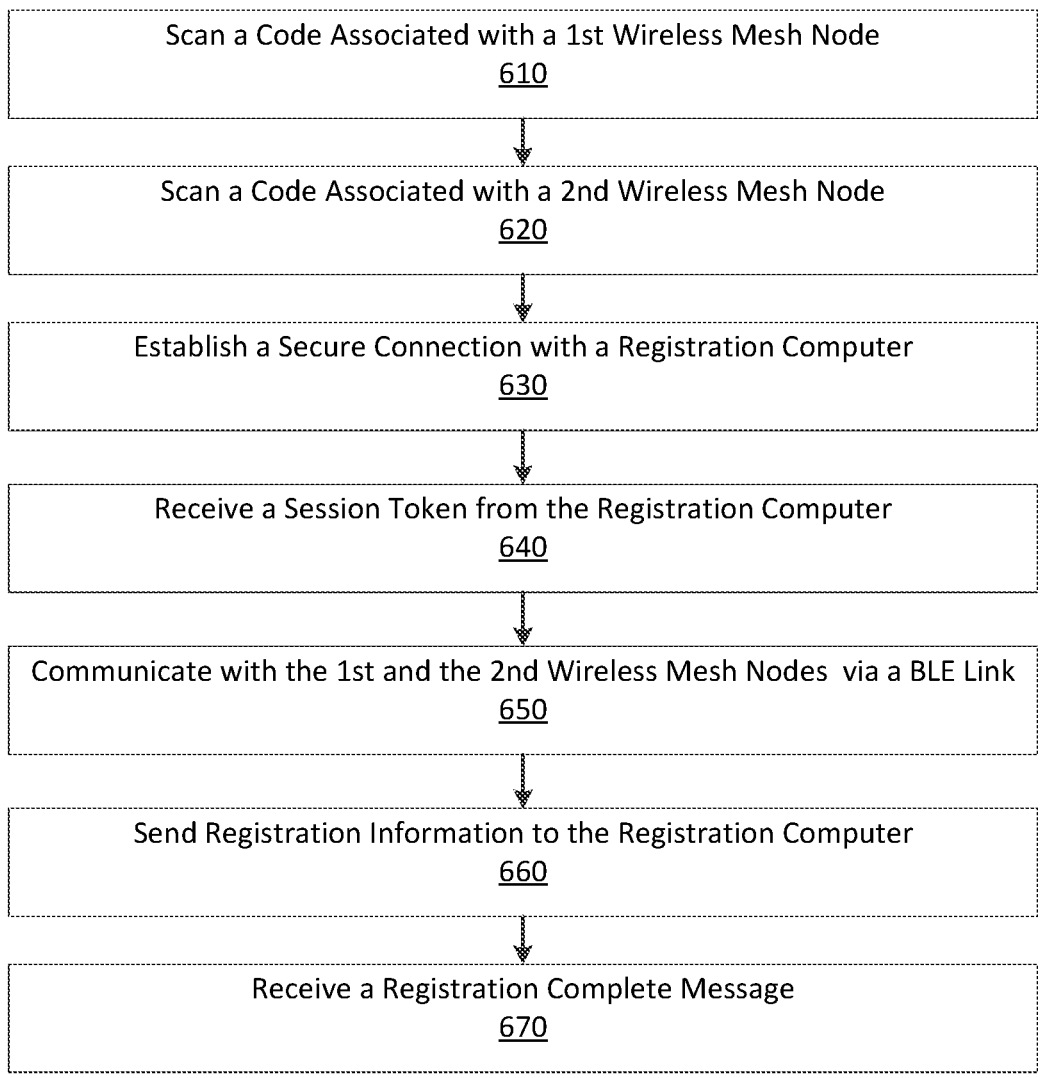
FIG. 6 illustrates exemplary steps that may be performed by a user device when more than one wireless mesh nodes are registered as part of a wireless mesh network.

FIG. 6 illustrates exemplary steps that may be performed by a user device when more than one wireless mesh nodes are registered as part of a wireless mesh network. FIG. 6 begins with step 610 where the user device scans a first code associated with a first wireless mesh node. In step 620 of FIG. 6 the user device may scan a code associated with a second wireless mesh node. The codes scanned in steps 610 may be a label, a bar code, a QR code, or a NFC chip/tag. These codes may include information that uniquely identifies a wireless mesh node and may include authorization codes used to authenticate a mesh node when a mesh node is added to a wireless mesh network or when a mesh network is initially provisioned with mesh nodes. Unique mesh node identifiers can be any type of identifier, such as a device serial number. Codes scanned in steps 610 and 620 of FIG. 6 may be included in product packaging of a respective mesh nodes, may be included in a mesh node, or may be printed on a surface of a mesh node's enclosure.

In step 630, the user device may establish a secure connection with a cloud management system, such as cloud management system 110 or 510 of FIGS. 1 and 5 that act as a registration computer that is physically remote from the user device. This registration computer may reside in the cloud or be accessible via the Internet using a first type of communication connection. The secure connection established in step 630 may send information through a secure socket layer (SSL) session or a secure hypertext transfer protocol (HTTPS) tunnel. Security keys or codes to registration computer (such as the cloud management system 110 of FIG. 1) may have been received by the user device when the user device scanned a codes like the codes scanned in steps 610 and step 620 of FIG. 6.

These codes may be in the form of the QR code of FIG. 3 or another form of code or device that can be read or scanned by a scanner, camera, or sensor at a user device. These codes can be a code uniquely identifies a particular mesh node such that the mesh node may be associated with a mesh network and with the user device when the mesh network is configured or when the mesh node is added to an existing mesh network. These codes may include the previously mentioned unique mesh node identifier and may also include the previously mentioned access codes. Furthermore, these codes may be encrypted before they are sent to the registration computer. By registering particular mesh node identifiers (e.g. mesh node serial numbers) with a particular customer, management systems such as cloud management system 110 and 510 of FIGS. 1 and 5, methods consistent with the present disclosure may not allow a mesh node with serial number ABC that belong to customer XYZ from being incorporated into a computer network of another customer. Because of this, registration processes consistent with the present disclosure may discourage theft.

The process of establishing the secure connection with the registration computer may include a two-factor validation process. This two-factor process may include the registration computer sending a code or identifier to the user device via a second type of communication connection and the user device may provide this information back to the registration computer over the first type of communication connection. In such instances, the first type of communication interface could be a wireless communication connection, such as a cellular communication connection/channel. The second type of communication connection/channel could be an email, a text (SMS) message, may be a phone call that provides voice or audio data. After receiving the code or identifier via the first type of communication connection, the registration computer may validate that the user device is authentic by comparing the code/identifier sent over the first type of communication connection with the code/identifier received via the second type of communication connection. When these two codes/identifiers match, the registration computer may identify that the user device is a valid user device.

Such two-factor authentication processes are more secure that a single factor validation process because there is a very low probability that a hacker could exploit two different communication mediums or channels simultaneously. After a security code or number is received from the user device, the device may be validated by comparing information sent via a first communication channel with information received via a second communication channel. Here again these different communication channels may be different types of communication channels that use different types of communication mediums (e.g. an email medium and a secure communication tunnel, or a cellular communication channel and a secure communication tunnel).

A two-factor authentication process may require the user device to send information to the cloud management system that identifies alternative communication channels that may be used to communicate with the user device. These alternative communication channels may be identified in communications sent over the secure communication connection. Alternate communication channels may be identified using a phone number or an email address, for example. While such two-factor authentication processes may be preferred, methods consistent with the present disclosure may use any validation process known in the art or may use validation processes that use more than two communication channels, connections, or mediums (e.g. computer network HTTPS connection, a cellular medium, and an email communication connection).

Authentication processes used to validate a user device may also include information that was generated by or that was provided by one or more mesh node devices. For example, the cloud management system may communicate directly with a mesh node when validating that the user device and the mesh node can communicate with each other via yet another communication channel. Information received by the user device via a Bluetooth® communication received from the mesh node may be sent via an HTTPS tunnel when the cloud management system validates that the user device can communicate with the mesh node. Alternatively or additionally, the cloud management system may communicate with a mesh node via a communication channel that communicates with members or proposed members of a mesh network. For example, a first mesh node may communicate directly or via a mesh portal using a cellular network after that mesh node has received information that identifies the user device. As such, a cloud management system may use information that validates that a particular user device can communicate with one or more mesh nodes when those mesh nodes and the user device are configured as part of a mesh network.

After the user device is validated, the registration computer may then generate and send a session token to the user device that is received by the user device in step 640 of FIG. 6. This session token may be a token that is unique to the current secure communication session.

Next, in step 650 of FIG. 6, the user device may communicate with both the first and the second wireless mesh node as those mesh nodes as part of a mesh node registration process. These communications may be performed using a low power data communication interface like Bluetooth® and these communications may be consistent with the BLE communications discussed in respect to FIG. 2. Then, in step 660 of FIG. 6 the user device may send registration information to the registration computer. The information sent to the registration computer may include identifiers that identify the first and the second wireless mesh node and may include authorization codes respectively associated with the first and the second wireless mesh node. After the registration computer receives the registration information, the registration computer may check that the information received is consistent with a registration rule or may perform a license check as described in respect to step 260 of FIG. 2.

For example, the user device may communicate with a mesh node device via BLE link 203 of FIG. 2 when performing functions consistent with processors or other components associated with BLE link 203 and with host 206 of FIG. 2. Note that a first processor at a mesh node may be coupled to BLE link 203 and this first processor may communicate with a second processor of host 205 when the first and the second processor execute instructions out of respective memories when performing functions consistent with the present disclosure. The registration information may then store information that cross-references mesh node device unquiet identifiers with customer information. Registration rules may cause the registration computer to check to see that each respective mesh node identifier corresponds to factory issued authorization codes that were previously stored in a database. Once each respective mesh node device is validated, the database may be updated to store information that associates the first and the second mesh node with a valid customer license.

While this registration information may be received from a user device via a secure communication connection as discussed in respect to FIG. 2. Alternatively this registration information or a portion thereof may be received from mesh node devices that are being configured. In certain instances, the registration information may include any of a user ID, the session token sent to the user device in step, an authorization code, device identifying information, device serial numbers, or other information associated with the user device or with particular mesh nodes.

An authentication code sent to the registration computer or cloud management system may be a code that was sent to a user device that may have originally be sent to the user device from a mesh node device using steps that may be consistent with communications 218, 221, and 224 of FIG. 2. The broadcasted message 224 may also include a serial number that identifies a particular mesh node and message 224 may include encoded or encrypted data. In certain instances, the received registration information may be encoded or encrypted.

An onboarding process implemented by the registration computer or cloud management system of FIG. 2 may use received information validate that particular mesh node devices or the user device can be associated with a validated license as described in respect to item 260 of FIG. 2. Part of this validation process could include decoding or decrypting the registration information. In certain instances, the registration information may include serial numbers from various different mesh node devices, other identifiers, or authorization codes associated with different respective mesh node devices. The validation may also include checking that one or more serial numbers and that one or more authorization codes correspond to devices that were manufactured by a particular manufacturer.

For example, this process could be designed to operate only with mesh node devices that have been validated as having been manufactured by a particular company. In such instances, a cloud management system may access a database of information that cross-references serial number information with authorization codes that were assigned to respective devices during a manufacturing process. In an instance when a particular serial number and a respective authorization code do not match information stored in the database, the mesh node that has that particular serial number may not be allowed to join a wireless mesh network. Alternatively, when serial number and authorization information received in step match information stored in the database, the mesh node device with that matching serial number may be allowed to join a wireless mesh network.

While not illustrated in FIG. 6, information identifying that one or more devices are associated with a validated license may be stored in the database. The information stored in the database may identify a plurality of devices that are included in a particular wireless mesh network, may identify one or more user devices that can connect to that particular wireless mesh network, or may identify other characteristics of a wireless mesh network. As such, an administrator or a user may be able to access stored information when reviewing information associated with each and every mesh node in a wireless mesh network. By reviewing this information a user may be able to identify where different wireless mesh nodes are located in a wireless mesh network relative to locations where other mesh nodes are located in the wireless mesh network. As such, this information may identify that a first mesh node is a mesh portal and may identify that a second mesh node is a mesh portal that is located 3 wireless hops from the mesh portal.

Information stored at this database may also include profile or configuration information. This profile information may identify mesh nodes that are configured as a mesh portal and mesh nodes that are configured as a mesh point. The profile of a wireless mesh network may also identify type of communication traffic that can be communicated over frequency band at an 802.11 wireless network. For example, a profile may allow a 5 GHz radio band to communicate both mesh-backhaul and client traffic, where a 2.4 GHz radio band may be configured to only transfer client traffic. After devices are associated with a validated license in step 650 of FIG. 6 a registration complete message may be sent to a user device in step 660 of FIG. 6. Profile information may include any sort of information that identifies rules or software requirements of mesh node in a wireless mesh network. This profile information may identify a maximum number of hops that may be included in a wireless mesh network or include information that identifies a number of mesh points that can communicate with a single wireless mesh portal in a wireless mesh network. Software configurations associated with a profile may identify operating system version information or program applications that should be installed at different mesh nodes in a wireless mesh network. In certain instances, software configurations at a mesh node may include how respective mesh nodes store data relating to previous access requests in cache memories at the wireless mesh nodes. A single set of profile criteria may be used to control the configuration or settings at all mesh nodes in a particular wireless mesh network.

Profile information may also identify preferred methods for identifying which mesh nodes should communicate with other mesh nodes in a wireless mesh network. As such profile information could instruct mesh nodes to communicate with another mesh node based on a measures of relative signal strength, measures of signal to noise ratios, error rates, or based on measures of congestion. Here again exemplary measures of congestion may include, yet are not limited to an amount of time or average time required to send or receive communication packets, a number of devices connected to a particular mesh point, a number of communications or bytes being transmitted per unit time via particular mesh nodes, or a number of hops to a mesh portal.

Once registered particular mesh nodes have been mesh nodes in that wireless mesh network may receive configuration information, settings, or software updates from a computer at the cloud or Internet that securely sends the configuration information, settings, or software updates to the registered mesh nodes. As such, any new mesh node being added to a particular wireless mesh network may be configured in a manner consistent with a profile stored in a database of an onboarding service. In certain instances, this profile information may be stored at a user device that has been used to register a mesh node with the onboarding service.

In an instance when an additional wireless mesh node is added to an existing wireless mesh network, the process may include a user device scanning a code that is associated with the additional wireless mesh node. Here again, a mobile application like to mobile application 200 of FIG. 2 may include establishing a secure communication connection with a server that executes program code consistent with onboarding service 209.

After step 660 of FIG. 6, the registration computer may send a registration complete message to the user device and the user device may receive that registration complete message in step 670 of FIG. 6. After the registration process is complete, the first and the second wireless mesh nodes may be configured to operate as nodes in a wireless mesh network. Each respective mesh node may be configured according to configuration information associated with the validated customer license.

This configuration process may include the registration computer updating program code at each respective mesh node, may include the registration computer sending configuration parameters to the mesh nodes, or may include the user device sending configuration information or parameters to the mesh nodes. In certain instances, both the user device and the registration computer may store a same set of registration information. This registration information may identify a preferred topology of a wireless mesh network, may identify which specific mesh nodes are configured as mesh portal or mesh points, or may identify mesh points that may be promoted to a mesh portal. Parameters or mesh node settings may identify a maximum number of hops to a mesh portal or may identify conditions when communications should be switched between different respective mesh nodes, for example.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for adding wireless mesh nodes to a computer network, the method comprising:
   identifying, by a user device, information unique to a first wireless mesh node after receiving of a first set of encoded data;
   identifying, by the user device, information unique to a second wireless mesh node after receiving a second set of encoded data;
   sending, by the user device and based on identifying the information unique to the first wireless mesh node and the information unique to the second wireless mesh node, a first authentication request comprising an authentication code to the first wireless mesh node and a second authentication request comprising the authentication code to the second wireless mesh node via a low power wireless communication interface;
   receiving, at the user device via the low power wireless communication interface and in response to sending the first authentication request and the second authentication request, a connection message comprising a unique identifier associated with the authentication code, a first identifier associated with the first wireless mesh node and a second identifier associated with the second wireless mesh node;
   establishing communication sessions with the first wireless mesh node and the second wireless mesh node based on receiving the connection message, wherein each of the first and the second wireless mesh nodes verify the user device based at least in part on verifying a pairwise temporary key that is generated by using a first nonce, a second nonce, a machine address code (MAC) of the user device, a machine address code (MAC) of a host, and the authentication code, wherein the pairwise temporary key is verified by computing a machine integrity code (MIC) for the user device, and comparing the MIC computed for the user device with another machine integrity code (MIC) included in the connection message received via the low power wireless communication interface;
   receiving a first access granted message from the first wireless mesh node and a second access granted message from the second wireless mesh node via the low power wireless communication interface;
   sending validation information to a registration computer via a secure communication channel, the validation information including the information unique to both the first and the second wireless mesh nodes and the authentication code, wherein the validation information is based on a set of registration rules used to validate that the first identifier associated with the first wireless mesh node and the second identifier associated with the second wireless mesh node are matched to a set of previously stored identifiers; and
   receiving a registration complete message from the registration computer, wherein the first and the second wireless mesh nodes form at least part of a wireless mesh network after the receipt of the registration complete message.

2. The method of claim 1, further comprising:
   receiving via a second type of communication channel a code sent from the registration computer, wherein:
      the registration computer stores the code as the authentication code, and the secure communication channel is a first type of communication channel; and sending the code to the registration computer securely via the first type of communication channel, wherein the registration computer validates the user device when the stored authentication code matches the code received via the first type of communication channel.

3. The method of claim 1, further comprising: storing profile information at the user device.

4. The method of claim 1, further comprising: receiving profile information at the user device, the profile information identifying one or more rules for configuring wireless mesh nodes in the wireless mesh network.

5. The method of claim 4, wherein the profile information is received via a graphical user interface (GUI) at the user device.

6. The method of claim 1, further comprising: sending configuration information to the registration computer, wherein the registration computer stores the registration information in a database.

7. The method of claim 3, wherein the first and the second wireless mesh nodes are configured according to the profile information.

8. The method of claim 3, wherein the profile information identifies a maximum number of mesh points that are allowed to communicate with a single mesh node.

9. A non-transitory computer-readable storage medium having embodied thereon a program executable by a processor for implementing a method for adding wireless mesh nodes to a computer network, the method comprising:

identifying, by a user device, information unique to a first wireless mesh node after receiving a first set of encoded data;

identifying, by the user device, information unique to a second wireless mesh node after receiving a second set of encoded data;

sending, by the user device and based on identifying the information unique to the first wireless mesh node and the information unique to the second wireless mesh node, a first authentication request comprising an authentication code to the first wireless mesh node and a second authentication request comprising the authentication code to the second wireless mesh node via a low power wireless communication interface;

receiving, at a user device via the low power wireless communication interface and in response to sending the first authentication request and the second authentication request, a connection message comprising a unique identifier associated with the authentication code, a first identifier associated with the first wireless mesh node and a second identifier associated with the second wireless mesh node;

establishing communication sessions with the first wireless mesh node and the second wireless mesh node based on receiving the connection message, wherein each of the first and the second wireless mesh nodes verify the user device based at least in part on verifying a pairwise temporary key that is generated by using a first nonce, a second nonce, a machine address code (MAC) of the user device, a machine address code (MAC) of a host, and the authentication code, wherein the pairwise temporary key is verified by computing a machine integrity code (MIC) for the user device, and comparing the MIC computed for the user device with another machine integrity code (MIC) included in the connection message received via the low power wireless communication interface;

receiving a first access granted message from the first wireless mesh node and a second access granted message from the second wireless mesh node via the low power wireless communication interface;

sending validation information to a registration computer via a secure communication channel, the validation information including the information unique to both the first and the second wireless mesh nodes and the authentication code, wherein the validation information is based on a set of registration rules used to validate that the first identifier associated with the first wireless mesh node and the second identifier associated with the second wireless mesh node are matched to a set of previously stored identifiers; and receiving a registration complete message from the registration computer, wherein the first and the second wireless mesh nodes form at least part of a wireless mesh network after the receipt of the registration complete message.

10. The non-transitory computer-readable storage medium of claim 9, wherein the program is further executable to:

receive via a second type of communication channel a code sent from the registration computer, wherein:
the registration computer stores the code as the authentication code, and
the secure communication channel is a first type of communication channel; and send the code to the registration computer securely via the first type of communication channel, wherein the registration computer validates the user device when the stored authentication code matches the code received via the first type of communication channel.

11. The non-transitory computer-readable storage medium of claim 9, wherein the program is further executable to store profile information at the user device.

12. The non-transitory computer-readable storage medium of claim 9, wherein the program is further executable to receive profile information at the user device, the profile information identifying one or more rules for configuring wireless mesh nodes in the wireless mesh network.

13. The non-transitory computer-readable storage medium of claim 12, wherein the profile information is received via a graphical user interface (GUI) at the user device.

14. The non-transitory computer-readable storage medium of claim 12, wherein the program is further executable to send configuration information to the registration computer, wherein the registration computer stores the configuration information in a database.

15. The non-transitory computer-readable storage medium of claim 12, wherein the first and the second wireless mesh nodes are configured according to the profile information.

16. The non-transitory computer-readable storage medium of claim 15, wherein the profile information identifies a maximum number of mesh points that are allowed to communicate with a single mesh node.

* * * * *